United States Patent [19]

Eichstadt

[11] 4,269,429
[45] May 26, 1981

[54] TOW BAR FOR AIRCRAFT

[76] Inventor: Arvin B. Eichstadt, R.R. No. 1, Box 24, Crescent, Iowa 51526

[21] Appl. No.: 120,934

[22] Filed: Feb. 12, 1980

[51] Int. Cl.³ .......................... B60D 1/14; B64C 3/00
[52] U.S. Cl. .................................. 280/503; 180/14 C; 244/50; 280/491 A; 280/482
[58] Field of Search ................. 280/480, 482, 491 R, 280/491 A, 491 E, 493, 442, 443, 503, 504; 180/14 C, 14 A, 14 E; 244/50; 414/450, 453

[56] References Cited

U.S. PATENT DOCUMENTS

| 2,833,563 | 5/1958 | Pruitt | 280/482 |
|---|---|---|---|
| 2,944,837 | 7/1960 | Fotheringham | 280/503 |
| 3,132,886 | 5/1964 | Meaks | 280/503 |
| 3,895,828 | 7/1975 | Bitantis | 280/493 |
| 3,995,878 | 12/1976 | Geraci et al. | 280/503 |

Primary Examiner—Joseph F. Peters, Jr.
Assistant Examiner—Donn McGiehan
Attorney, Agent, or Firm—Hiram A. Sturges

[57] ABSTRACT

A tow bar for aircraft having a telescoping collapsible tongue connected to a yoke having right and left arms rearwardly extending to right and left aircraft engaging units for engaging opposite sides of an aircraft steerable nose-wheel assembly in which one of the arms pivots with respect to a shoulder portion of the yoke so as to swing out to one side to release an aircraft, a holding assembly for holding the swinging arm rigidly in towing position comprising a pin removably positionable in an opening in the shoulder and swinging arm, the arms and shoulders being economically fabricatable primarily from inexpensive mass-produced members welded together.

10 Claims, 4 Drawing Figures

U.S. Patent
May 26, 1981
4,269,429
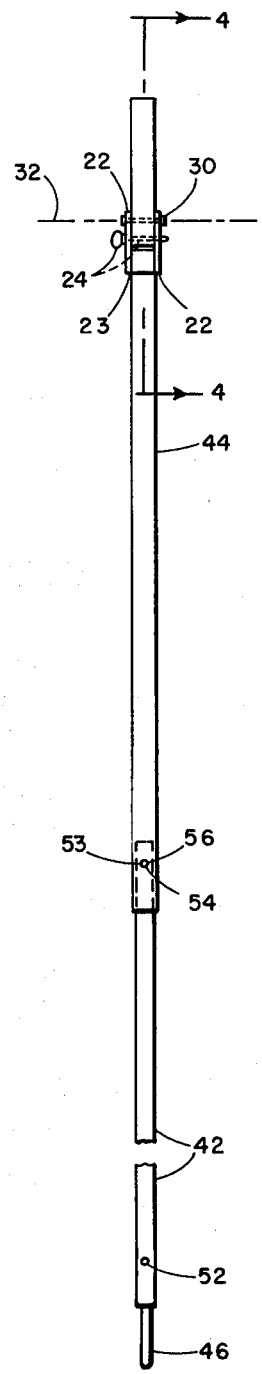
FIG. 2
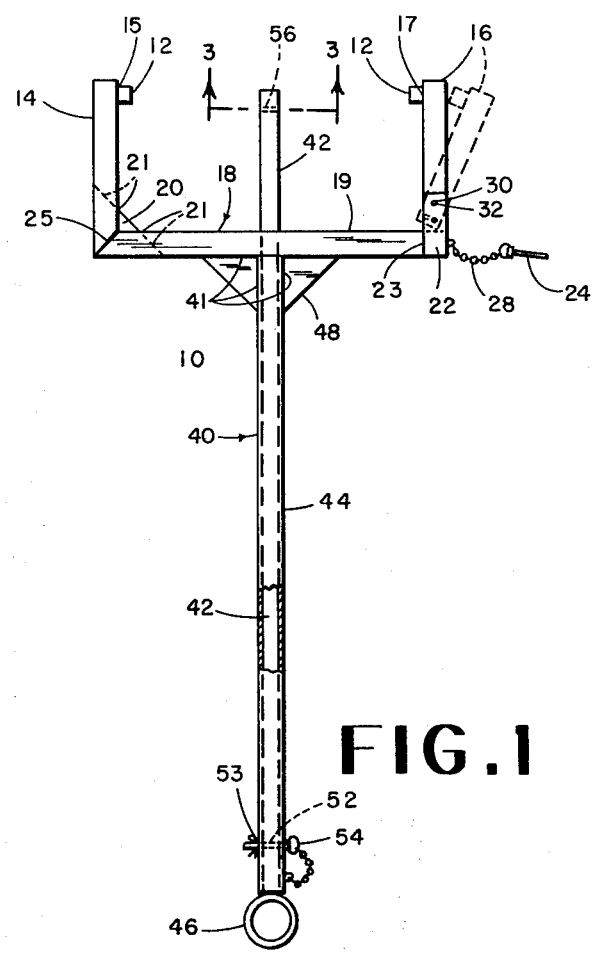
FIG. 1
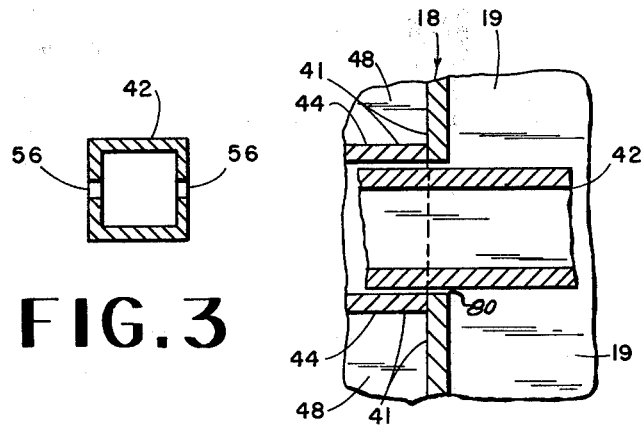
FIG. 3
FIG. 4

TOW BAR FOR AIRCRAFT

BACKGROUND OF THE INVENTION

In the past aircraft tow bars have been unnecessarily costly and have been bulky and hard to store aboard an aircraft.

When an aircraft can bring with it its own tow bar, then the right equipment is readily available. It is then unnecessary to provide a tow bar designed to fit many different types of aircraft.

However, for a tow bar to be carried aboard an aircraft, it is necessary for the long tow bar to be collapsible to a much smaller size.

It is also desirable that when the tow bar is extended that it have a rigid length, such that, if necessary, it can be used not only to pull the aircraft, but also to push it backwards in maneuvering the aircraft into tight storage position.

In the past, expensive machining has sometimes been required in the manufacture of specialized forms of parts with many curved surfaces and parts with notches of special shapes.

It is an object of this invention to make possible fabrication by inexpensive shearing or cutting and welding operations and from parts, primarily available on the market in economical forms fabricated at steel mills be inexpensive methods used to make extruded standard steel forms or steel plating.

Since welding equipment is now available for mass production of superior welds in short times, the total result can be a tow bar so readily affordable that one can be available for each aircraft and stored aboard the aircraft, rather than the former way. In the former way it was necessary to have tow bars of different kinds of air ports, each for a different type of aircraft, whereby a problem is encountered for the ground personnel to take out to the aircraft exactly the right tow bar which will fit the aircraft wheel assembly. Theoretically, this would have the advantage that many aircraft of one type could be towed during a period of time by a ground crew having a single tow bar for the aircraft coming in, no matter what their number. But the practicality of this theory is missing when the problems of having the right tow bar on hand at the right time, finding it and having it ready are considered.

In addition if multiple aircraft of the same type should come in at the same time, a single tow bar for all aircraft of one type could not be on more than one aircraft at once.

And so it is an object of this invention to provide a tow bar so conceived so as to be very inexpensive and so very light and collapsible, and which can be conveniently carried in the aircraft itself so that there is no trouble at all in finding the right tow bar when the aircraft comes in at an airport.

A further objective is to provide inexpensive and readily releasable interconnection with simple drop pins extending through pin openings at the yoke and in the telescoping tongue.

Yet another object is to provide a more complete collapsability by providing a way for a rearward part of the forward tongue section to be stored between the arms of an aircraft gripping yoke.

SUMMARY

A tow bar for aircraft comprising right and left aircraft engaging units horizontally spaced from each other for engaging opposite sides of an aircraft steerable nose wheel assembly, a C-shaped yoke having right and left arms each extending forwardly from and attached to the right and left engaging units, the yoke having a shoulder interconnecting the arms, one of the arms being pivotally attached to the shoulder for pivoting about a vertical axis, the shoulder and the one arm lapping each other in a position offset from the axis, a holding assembly operably correlated with the lapping portions and releasably holding the arm and shoulder in a rigid relationship, and a telescoping collapsible tongue attached to said yoke shoulder and extending forwardly therefrom, the holding assembly being a keeper opening extending through at least a portion of said shoulder and at least a portion of said arm, a keeper disposed in said opening and locking said one arm from pivoting about said axis.

BRIEF DESCRIPTION OF THE DRAWING

FIG. 1 is a top plan view of the tow bar assembly hereof with parts in storage positions, an out-swung position of the pivoting arm being shown in dotted lines.

FIG. 2 is a side elevation of the assembly of FIG. 1, but with tongue sections in extended positions for towing.

FIG. 3 is a sectional view taken along the line 3—3 of FIG. 1.

FIG. 4 is a sectional view taken along the horizontal line 4—4 of FIG. 2 but showing only the broken away central part of the tow bar assembly.

DESCRIPTION OF THE PREFERRED EMBODIMENT

In FIG. 1 an aircraft tow bar is generally indicated at 10 and comprises right and left aircraft-engaging units 12 which are capable of gripping opposite sides of an aircraft steerable nose wheel assembly, not shown.

One of the engaging units 12 is connected to a rearward end of a right stationary arm 14 by a weld 15. The other engaging unit 12 is connected to a rearward end of a left pivotable arm 16 by a weld 17. The stationary arm 14 is connected at its forward end to a shoulder generally indicated at 18, which has a transverse member 19 which extends at a right angle to the length of the stationary right arm 14.

The stationary right arm 14 is welded to the transverse member 19 of the shoulder 18 and is maintained in position by a reinforcing plate 20, which is held to the underside of the right arm 14 and transverse shoulder member 19 by suitable welds 21. The arm 14 is also welded to the transverse shoulder member at 25 along a 45° butt joint between the arm 14 and transverse member 19.

FIG. 2 shows upper and lower pivot arm attachment portions 22 of the shoulder 18, the attachment portions being disposed above and below the pivot arm 16 attached to the transverse member 19 of the shoulder 18 by welds 23 of FIG. 1.

A removable pivot arm holder pin 24 extends through an arm holder opening 26 extending through the pivot arm 16 and the upper and lower pivot arm plates 22. The pivot arm holder 24 is held to the shoulder 18 by a holder chain 28. When the pivot arm holder 24 is inserted through the holder opening 26, the pivot arm 16 is held stationary in a locking position.

In FIG. 2 it can be seen that a hinge pin 30 defines a vertical axis 32 on which the pivot arm 16 turns, and also extends through the pivot arm 16 and both the upper and lower pivot arm plates 22.

In FIG. 1 an elongated tongue is generally indicated at 40 and comprises a more forwardly extending first or forward tongue section 42 slidably received in a second or rearward sleeve tongue section 44, the sections 42 and 44 telescoping with respect to each other.

A towing hitch member 46, of the eye type, is attached to a forward end of the forward tongue section 42 and is attachable to a hitch member, not shown, of an aircraft towing vehicle, not shown.

A rearward end of the rearward tongue section or sleeve 44 is connected to the shoulder and is maintained stationary with respect thereto by right and left gussets 48 on the sides of the sleeve 44, the gussets 48 being attached to the tongue 40 and the shoulder 18 by welds 41.

A tongue section keeper assembly is generally indicated at 50 and comprises a first tongue opening 52 extending through the forward section 42 near its forward end, and a second tongue opening 53 in the sleeve 44. The keeper assembly 50 also includes a tongue pin 54, the latter being insertable at least into, or preferably through, the tongue openings 52 and 53, and holds the two tongue sections 42 and 44 stationary in a storage position, as seen in FIG. 1, in which position the rearward end of the forward inserted tongue section 42 is disposed extending beyond the shoulder 18 through an opening 80 in the shoulder 18 and slidably receiving the forward tongue section 42 therethrough.

A third tongue opening 56 is disposed forwardly of the first tongue opening 52. The tongue pin 54 is inserted into the third tongue opening when it is desired that the tongue be in a towing position, as shown in FIG. 2.

The tongue pin 54 is held to the tow bar by a second keeper chain 58, which is approximately identical to the keeper chain 28.

The two tongue sections 42 and 44, as well as the shoulder 18 and arms 14 and 16, are constructed of material that is flat on top and bottom sides so that the tow bars can be easily stacked one upon another in a factory.

I claim:

1. A tow bar for aircraft comprising: right and left aircraft-engaging units spaced horizontally from each other for engaging opposite sides of an aircraft steerable nose wheel assembly, right and left arms extending forwardly from and attached to said units, a shoulder extending from right to left and connecting forward ends of said arms, forward and rearward elongated tongue sections extending forwardly from said shoulder, said tongue sections being collapsably connected together and being positionable in storage positions in which the forward end of said forward section is much closer to said shoulder than when said tongue sections are in towing positions, said left arm being pivotally attached to said shoulder for pivoting about a substantially vertical axis, said shoulder and said left arm lapping each other in a position offset from said axis, a releasable holding assembly operably correlated with said lapping portions of said arm and shoulder for holding said arm and shoulder sufficiently rigid as to substantially maintain said units at a desired spacing for aircraft wheel carriage gripping, said rearward tongue section being attached to said shoulder, towing hitch means attached to the forward end of said forward tongue section, keeper means operably correlated with said tongue sections and releasably keeping said tongue sections in said towing positions.

2. The tow bar for aircraft of claim 1 wherein said shoulder comprises attachment portions lapping said first arm, said pivotal attachment comprising a pivot pin extending through said attachment portions and said first arm, said releasable holding assembly comprising an opening for a holding pin, said opening extending through at least one of said attachment portions and into said left arm, a holding pin removably received in said one attachment portion and in said left arm.

3. The tow bar for aircraft of claim 1 having gusset means rigidly connecting said rearward tongue section to said shoulder.

4. The tow bar for aircraft of claim 3 wherein said gusset means comprises right and left gussets.

5. The tow bar for aircraft of claim 1 wherein said tongue section keeper means comprises at least one tongue opening for receiving a tongue pin for maintaining said tongue sections in an extended position.

6. The tow bar for aircraft of claim 5 further comprising a tongue section keeper means comprising a first tongue opening through said forward tongue section, a second tongue opening in said rearward tongue section, a third tongue opening in said forward tongue section, a tongue pin insertable into at least one of said tongue openings.

7. The tow bar for aircraft of claim 6 wherein said tongue keeper means further comprises a flexible pin holding means attaching said pin to said tow bar for preventing said pin from being lost when not in use.

8. The tow bar for aircraft of claim 1 wherein said tow bar has substantially flat upper and lower surfaces so as to be easily stored when not in use.

9. The tow bar for aircraft of claim 1 having said forward tongue section having a rearward end which is slidably extendable past said shoulder so as to be between said arms when in storage position.

10. The tow bar for aircraft of claim 1 having said shoulder having an opening therethrough slidably receiving a rearward portion of said forward tongue section being disposed between said arms in storage position.

* * * * *